United States Patent [19]

Arlt et al.

[11] 4,291,254
[45] Sep. 22, 1981

[54] DISCHARGE LAMP ENERGIZATION CIRCUIT, PARTICULARLY FOR AUDIO AND SUPERSONIC FREQUENCY OPERATION OF HIGH-PRESSURE DISCHARGE LAMPS

[75] Inventors: Joachim Arlt, Munich; Dietrich Fromm, Warngau, both of Fed. Rep. of Germany

[73] Assignee: Patent-und-Gesellschaft für elektrische Glühlampen m.b.H., Munich, Fed. Rep. of Germany

[21] Appl. No.: 127,372

[22] Filed: Mar. 5, 1980

[30] Foreign Application Priority Data

Mar. 12, 1979 [DE] Fed. Rep. of Germany ...... 2909605

[51] Int. Cl.³ .......................................... H05B 41/36
[52] U.S. Cl. .................................... 315/240; 315/208; 315/226; 315/287; 315/307; 315/DIG. 7
[58] Field of Search .................... 315/205, 208, 209 R, 315/224, 240, 287, 307, 311, DIG. 7, 226

[56] References Cited

U.S. PATENT DOCUMENTS

| | | | |
|---|---|---|---|
| 3,710,177 | 1/1973 | Ward | 315/311 X |
| 3,733,541 | 5/1973 | Elms | 315/205 X |
| 4,170,747 | 10/1979 | Holmes | 315/307 |

*Primary Examiner*—Eugene R. LaRoche
*Attorney, Agent, or Firm*—Frishauf, Holtz, Goodman & Woodward

[57] ABSTRACT

Discharge lamp energization circuit to operate a discharge lamp 1 over two electronic switches 10, 11, for example high-voltage, high-current switching transistors, which alternately apply a d-c voltage connected across two capacitors 4, 5, in opposite polarity, to the lamp circuit. The capacitors have the same value, and the lamp circuit includes a serially connected inductance. The electronic switching transistors are supplied from a frequency constant square-wave generator 16, at frequency high with respect to power line frequency, for example within the audio or supersonic range, e.g. 7.5 kHz. A separate ignition or starting circuit may be provided or the series inductance 2 and a capacitor 20 connected in parallel with the lamp may form a series resonance circuit tuned to a low odd harmonic (3, 5 7) of the lamp operating frequency.

18 Claims, 4 Drawing Figures

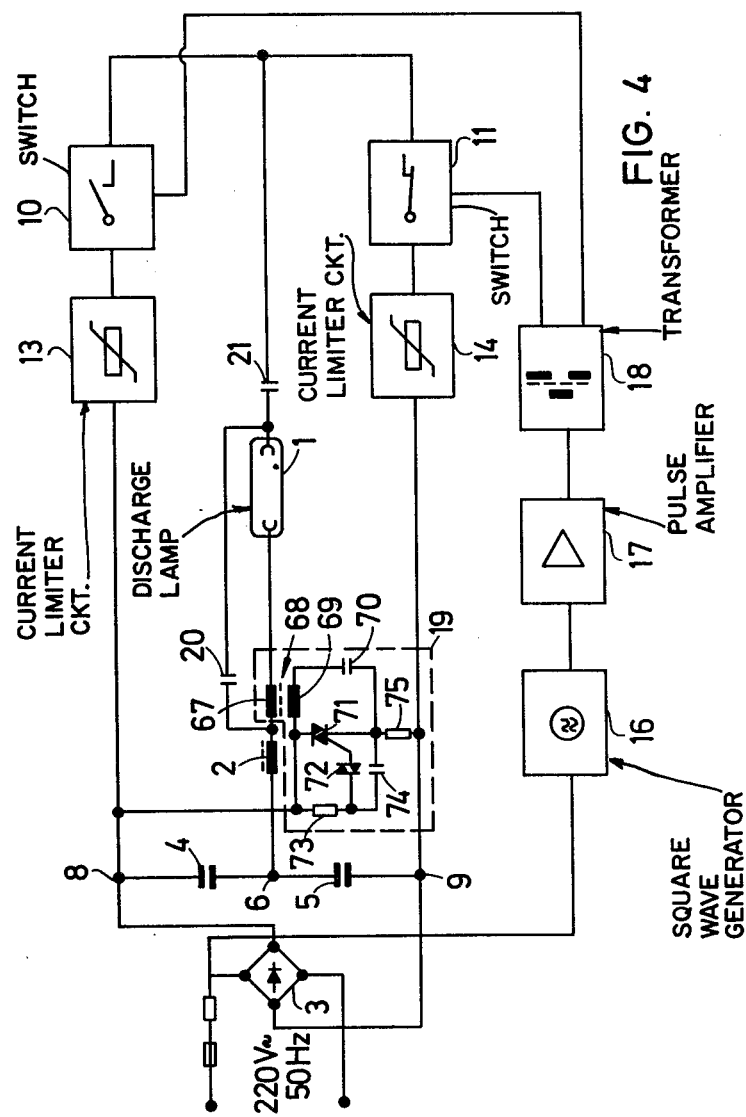

DISCHARGE LAMP ENERGIZATION CIRCUIT, PARTICULARLY FOR AUDIO AND SUPERSONIC FREQUENCY OPERATION OF HIGH-PRESSURE DISCHARGE LAMPS

The present invention relates to a discharge lamp energization circuit, and more particularly to a circuit to operate a high-pressure discharge lamp from a power supply, typically 50 or 60 Hz of 110 or 220 V a-c, in which the lamp itself receives energy at a substantially higher frequency, up to 100 kHz, the circuit including an ignition circuit and an inductance in order to limit lamp current.

Background and Prior Art. It has previously been proposed to operate discharge lamps, and particularly high-pressure discharge lamps, at elevated frequency, typically in the audio and supersonic range, using blocking oscillators or push-pull oscillators, providing for inherent or self-oscillation. These apparatus have only moderate efficiency, from between 60 to 80%, due to the relatively long switching time. The apparatus is usually not frequency-stable and frequency changes under change in loading may result.

Operation of high-pressure discharge lamps at the audio and supersonic range provides controlled units which are stable and furnish a frequency-stable signal, in which the frequency can be matched to the particular lamp. It has been found that the discharge arcs of high-pressure discharge lamps have instability ranges due to resonance effects within certain frequency ranges. It is, therefore, desirable that the supply of the frequency be matched to the particular lamps involved.

The Invention. It is an object to provide an electronic discharge lamp energization circuit which has good efficiency, is suitable particularly for use with high-pressure lamps, is small, of low weight, and is efficient, while resulting in stable lamp operation.

Briefly, the input circuit provides a d-c output which is applied to a series circuit having two capacitors of equal capacity value. These capacitors are serially connected across the d-c voltage supply. A series circuit of inductance and the lamp itself is connected to the junction of the serially connected capacitors. A first electronically controlled switch, for example a transistor switch, is connected to the free terminal of one capacitor; a second, preferably similar electronically controlled switch is connected to the free terminal of the other capacitor. The switches are connected to the other lamp terminal and forming the free terminal of the series circuit of the lamp together with an inductance. A timing control circuit is connected to control the conductivity of the electronic switches to be alternately conductive, the timing control circuit providing a frequency-stable output control signal to the switches at a frequency matched to a certain operating frequency of the lamp, thereby controlling the electronically controlled switches to essentially instantaneous conduction and cut-off, respectively, and providing an essentially square-wave voltage of the frequency which is matched to the lamp, and thus supplying a-c square-wave voltage to the lamp circuit.

The electronic switches preferably are switching transistors which permit control with extremely short switching time. This reduces the switching losses to a minimum. The frequency of the output supplied to the lamp is essentially independent of loading, so that the lamp will be operated at a stable frequency. This permits use of the apparatus with high-pressure discharge lamps, and at an operating frequency in a range in which the lamp operates in a stable mode. The system can be used also with low-pressure lamps.

Drawings, illustrating a preferred embodiments:

FIG. 4 is another embodiment in which the ignition system is modified, the remaining portions being illustrated in block diagram form.

Figure 1:
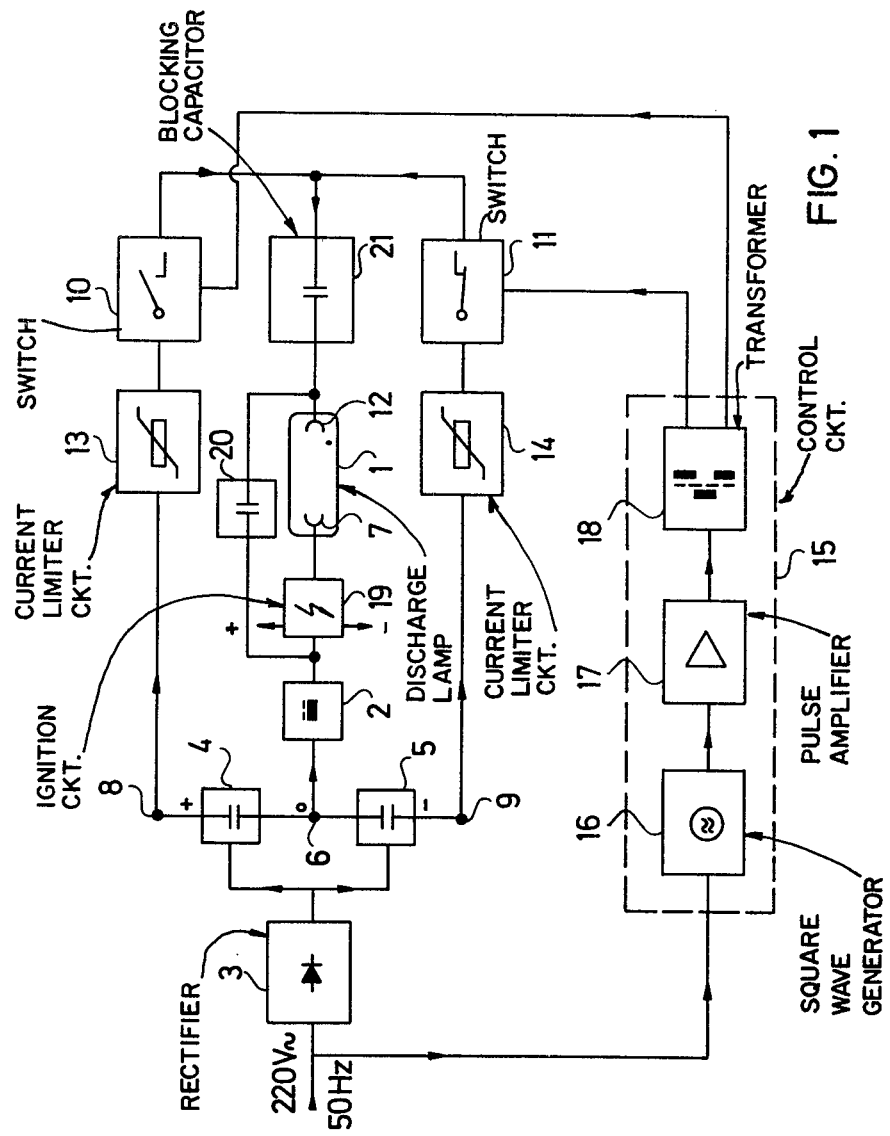
FIG. 1 is a general block circuit diagram of the system.

Embodiment of FIG. 1, with reference thereto: A discharge lamp, for example high-pressure discharge lamp 1, is operated with a-c of elevated frequency, preferably in the high audio or low supersonic range, for example between 500 Hz to 20 kHz. An inductance 2 is serially connected with the lamp 1. Power supply is from a rectifier 3 which is connected to a 220 V/50 (or 60) Hz a-c power supply network. The rectifier 3 which, preferably, is a bridge rectifier, is connected to a series circuit formed of two capacitors 4, 5, of equal capacity. The center tap or junction 6 between the series circuit of the capacitors 4, 5 is connected through inductance 2 to one electrode 7 of lamp 1. The outer or free terminals 8, 9 from the capacitors 4, 5 are connected through a respective electronic switch 10, 11, each, with the second electrode 12 of the lamp 1. An electronic current limiter circuit 13, 14, respectively, is serially connected between the junctions 8, 9 and the switches 10, 11.

Switches 10, 11 are controlled to open or to conduct, respectively, by a control circuit 15. Control circuit 15 has a frequency stabilized square-wave generator 16, connected to a pulse amplifier 17 which, in turn, is connected to a control transformer 18. The high-voltage required to start the lamp 1 is provided by an ignition circuit 19. A high-frequency short-circuit or bypass capacitor 20 is connected in parallel to lamp 1 and the ignition circuit 19. In a modified embodiment the ignition circuit 19 may be omitted. In such cases the values of the inductance 2 and the capacitor 20 connected to the lamp are so matched that they form a series resonance circuit with respect to the third or the fifth or the seventh harmonic of the frequency of operation of the lamp. The high voltage arising at the capacitor 20 permits ignition of the lamp. A capacitor 21, in series with the lamp, is provided to block any possible d-c through the lamp.

The rectifier 3 which provides d-c of equal value to the two capacitors 4, 5, which have the same capacity. If the network a-c voltage is $U_N$, then the respective capacitor voltages $U_{GL1} = U_{GL2} = \frac{1}{2} U_N \sqrt{2}$. D-C voltages are tapped off the capacitors and are applied, selectively, by the controlled switches 10, 11, with opposite polarity to the lamp. The switching frequency is in the audio or supersonic range and is determined by the square-wave generator 16 which provides a frequency-stable output in order to operate the lamp with essentially square-wave alternating voltage at a frequency which is high with respect to that of the power supply.

Figure 2:
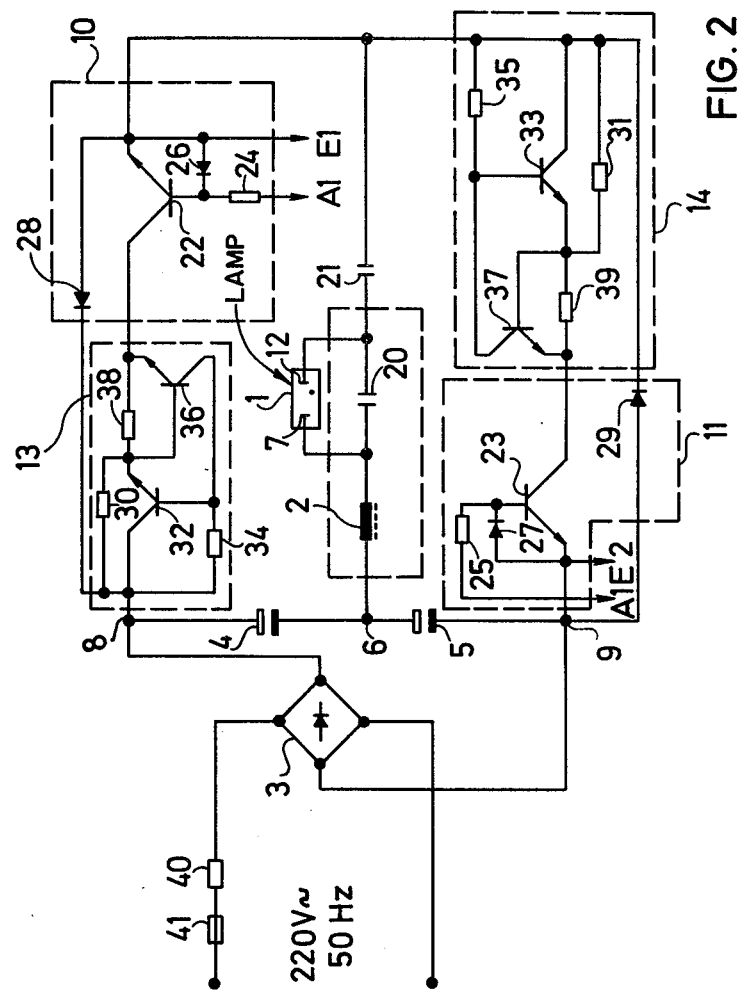
FIG. 2 is a fragmentary diagram with a resonant ignition circuit, and omitting the control portion.

The detailed circuit as seen in FIG. 2: The rectifier 3 is a bridge rectifier connected to a 220 V 50 Hz a-c power network through a fuse 41 and a coupling or protective resistor 40. The bridge rectifier provides its output to two capacitors 4, 5, being connected to the junctions 8, 9. The capacitors 4, 5 form charge storage capacitors with respect to the power supply network. They may have safety discharge resistors of high-resistance value—to provide little loading—in parallel thereto. With respect to audio frequency, capacitors 4, 5 operate as filter capacitors. The capacitors, therefore, have a dual function.

The switching paths of the electronic switches 10, 11 are formed by the collector-emitter paths of transistors 22, 23 which are high-voltage, high-current transistors. One switching path is connected to the positive supply voltage $U_{GL1}$, the other with the negative supply voltage $U_{GL2}$. The two transistors 22, 23 are controlled in push-pull by control connections to their bases, respectively, having base resistors 24, 25. The transistor connections A1, E1 and A2, E2 are connected to equally labelled terminals of the control circuit, shown in detail in FIG. 3. The base-emitter junctions of the transistors 22, 23 are bridged by rectifier diodes 26, 27, in order to ensure short recovery time of the transistors 22, 23 and to prevent spurious control of the transistors due to stray inductances of the transformer 18.

Protective diodes 28, 29 are connected between the output terminals of the switches 10, 14 and junctions 8, 9 respectively. They prevent current flow in reverse direction over the collector-emitter paths of the switching transistors 22, 23. Such a current could result due to the starting and ignition conditions of the respective lamps, in combination with the current limiting inductance or choke 2, and may appear in the form of inductive pulses. The protective diodes 28, 29 can also be so arranged that they are connected in parallel only to the respective collector-emitter paths of the transistors 22, 23. The current limiting circuits 13, 14 have limiting resistors 30, 31 which are bridged by the collector-emitter paths of the transistors 32, 33. The bases of the transistors 32, 33 are connected over respective resistors 34, 35 with the respective collector and over the collector-emitter paths of the second transistor 36, 37 and the resistors 38, 39 with the respective emitter. Insertion or removal of the current limiting circuits 13, 14 is obtained automatically.

Operation of current limiting resistors 13, 14: The limiting resistances 30, 31 are placed in circuit in dependence on the voltage drop across the resistors 38, 39. If the second transistors 36, 37 are blocked or non-conductive, transistors 32, 33 are controlled to be conductive by the voltage drop across resistors 34, 35. The limiting resistors 30, 31 thus are shunted by the conductive transistors 32, 33. When the voltage drop across resistors 38, 39 exceeds a certain value, the transistors 36, 37 change over to conductive state. Thus, the collector-emitter paths of the transistors 32, 33 are controlled to be non-conductive or blocked, and resistors 30, 31 are fully effective as current limiting resistors. To prevent oscillation, the respective bases of the transistors 32, 33 and 36, 37 may have resistors serially connected thereto. Such resistors are not specifically necessary, and their use will depend on the particular type of transistor employed. These resistors are not shown and their use is evident. The embodiment shown does not use a separate ignition circuit.

The inductance 2 is so dimensioned with respect to the capacitor 20 connected in parallel to the lamp that the series resonance circuit is matched to the third harmonic of the lamp operating frequency. This is the preferred harmonic. The capacitor 21 is employed to block any possible lamp direct current. Substantial lamp direct current may result if the lamp operates only in one polarity direction during the ignition and transfer or take-over period. Under such condition, the limiting effect of the choke 2 is lost and the resulting short-circuit current could destroy or at least severely damage the semiconductors in the electronic switches. The bridge rectifier 3 is protected by resistor 40, and the mains supply by fuse 41.

In one illustrative example, lamp 1 is a mercury high-pressure discharge lamp with metal halogen additive, that is, is a molecular radiator, with 75 W power consumption rating. An operating frequency of 7.5 kHz is suitable for such a lamp. The resonant series circuit formed by inductance 2 and capacitor 20 thus is matched to a frequency of 22.5 kHz—that is, to the third harmonic.

Figure 3:
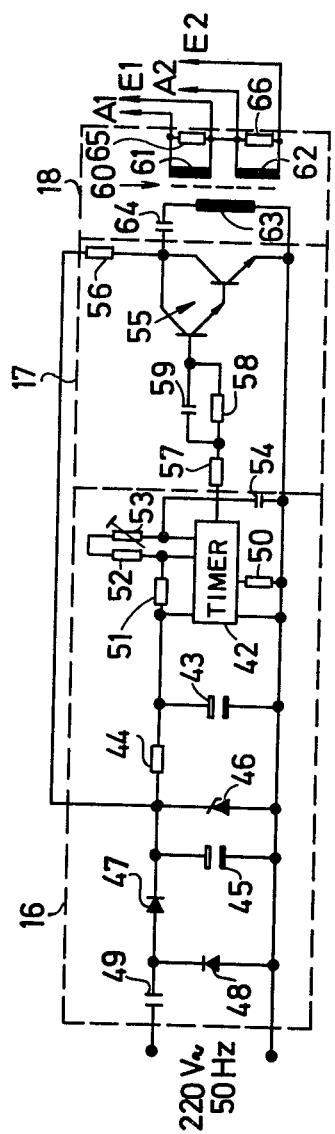
FIG. 3 shows the control portion for use with the circuit of FIG. 2.

The control circuit is shown in FIG. 3. A timing circuit 42 is provided within the square-wave generator 16. Timing circuit 42 preferably is an integrated circuit which is effectively compensated or balanced to be insensitive with respect to temperature variation and operating voltage variation. A filter capacitor 43 provides power to the timer 42, and acts as a smoothing capacitor. Capacitor 43 is charged over resistor 44 and receives its power from a voltage-limited capacitor 45. The voltage across capacitor 45 is limited by Zener diode 46, connected in parallel thereto. Capacitor 45 is charged through a rectifier network having diodes 47, 48 and a capacitor 49 from the power supply network. The rectifier 48 is a reverse current diode which is provided to maintain flow of a-c to re-charge the capacitor 49 during the negative half waves. Filter capacitor 43, for example, has a voltage of 12 V thereon in order to supply timer 42. The square-wave generator 16 itself includes the timer 42, resistors 50, 51, 52, 53 and capacitor 54. The square-wave generator 16 has a pulse amplifier 17 connected thereto which includes a Darlington transistor 55, that is, a transistor having a high current amplification with low control current. The pulse amplifier 17 receives its power supply over resistor 56 connected to the voltages-limited capacitor 45, which provides a supply voltage of about 40 V. The base of the transistor 55 is controlled over resistors 57, 58 and coupling capacitor 59. An output controlled transformer 60 has two secondary windings 61, 62, well insulated from each other, in order to provide galvanic separation of the output circuits from the transformer. The primary 63 is connected over a d-c isolating capacitor 64 to the collector-emitter path of transistor 55. The secondaries 61, 62, each with an appropriate damping resistor 65, 66 in parallel thereto, are oppositely poled and connected to the terminals A1, E1 and A2, E2, respectively, of the electronic switch 10, 11 (FIG. 2).

The circuit of FIG. 4 differs from that of FIGS. 1–3 in that an additional starting or ignition circuit 19 is provided. The remaining elements are the same and shown in block diagram form. The secondary winding 67 of a pulse transformer 68 is serially connected to lamp 1, the transformer winding 67 and lamp 1 being bridged by the high-frequency short-circuiting capacitor 20. The primary 69, in series with a pulse capacitor 70, has a Triac 71 connected as shown. The Triac itself is controlled by a Diac 72, to operate with a pulse frequency of about 500 Hz. The 500 Hz signal for the Diac controlling the Triac is obtained by a timing circuit comprising resistor 73 and capacitor 74. The anodes of the Triac 71 are connected to the terminals 8, 9 of the capacitors 4, 5. One of the anodes of the Triac 71 has the resistor 75 serially connected thereto. The Triac 71 supplies the charge on the capacitor 70 to the primary 69 of the pulses transformer 68, the output of which provides a starting or ignition voltage of about 4 kV$_S$.

In an experimental pilot circuit, it was found that the system has advantages with respect to customary inductances: The losses are reduced by more than 50%, and the starting and power supply circuit requires only about 7–8 W operating power for itself rather the previously customary 16 W for a lamp of 75 W. The volume can be reduced to less than 25% of that of previous circuits, and a compact circuit constructed within a space of 215 cm$^3$, whereas prior circuits with much larger inductances required almost 1000 cm$^3$. The weight could be reduced from over 2 kg to about ¼ kg (266 g), a reduction to 13% of previous values. Higher operating frequencies can be obtained, the lamp can operate in the audio and supersonic ranges resulting in higher light output. The light output itself could be increased to 108% of previous values. Further reduction in size and weight can be contemplated by use of smaller and more compact electronic components. The overall circuit structure thus can be integrated with a high-pressure lamp in a handy compact unit.

Square-wave generator 16: the timing circuit 42 and the associated outer elements form an astable multivibrator with a square-wave output direct voltage having a time to interval ratio of 1:1. The operating frequency suited for the lamp type is generated by the external wiring and outer elements of the timing circuit 42. The frequency of 7.5 kHz was selected from several stable frequency ranges for the 75 W mercury high pressure discharge lamp with metal halogen additives that was used. Capacitors and coils can be selected to be the smaller in space the higher the operating frequency can be. As the transistors 22, 23 pass through a large power range during switching through it is necessary that they are driven hard in as short a time as possible to avoid unnecessary losses. Control of the transistors 22, 23 with square-wave voltage permits the shortest switching times and thus the lowest losses.

Ignition with a resonant circuit comprising inductance 2 and capacitor 20: in the case of the resonant ignition, the resonant voltage of, e.g., the third harmonic of the switching frequency arises at the capacitor 20 and ignites the lamp 1. The ignited lamp bridges the resonant circuit capacitor 20 and thus interrupts the resonance during the further operation of the lamp. The more a lamp is willing to ignite, the smaller can be selected the resonant circuit capacitor 20. A capacitor will be selected having a capacitance which is as low as possible and with whose charge the lamp still ignites reliably. As the capacitance of the capacitor 20 is not very critical, it can be selected so that resonance occurs with the inductance 2 for an odd multiple of the lamp operating frequency. This fact determines which harmonic is eligible for ignition.

Ignition by using an ignition circuit 19: after ignition of the lamp 1, the iron of the pulse transformer 68 is saturated due to the lamp current across coil 67 so that high voltage pulses can no longer result although the triac 71 continues to be triggered.

In the foregoing example in accordance with FIG. 2, transistors 22, 23 were of the type BUX 82 or the like, choke 2 had an inductance of 2.8 mH, lamp 1 was of the type: mercury high pressure discharge lamp with metal halogen additives, 75 W for interior lighting, capacitor 20 had a value of 19 nF (suitable for the resonance case of the third harmonic), capacitors 4, 5, each, had a value of 140 µF, capacity of capacitor 21: 3.3 µF, dropping resistor 40: 1 ohm.

The IC 42 (FIG. 3) was of the type 355 by TELEDYNE, capacity of capacitor 43: 47 µF, capacity of capacitor 45: 220 µF, transformer 60: pot-core type, diameter 22 mm, height 13 mm, without air gap, primary winding 63: 600 turns, diameter 0.1 mm, secondary windings 61, 62: 60 turns and 0.22 mm diameter each.

Various changes and modifications may be made within the scope of the inventive concept.

We claim:

1. Discharge lamp energization circuit to energize a lamp (1) with alternating current at a frequency high with respect to power line frequency (50, 60 Hz) having
   an inductance (2) serially connected to a terminal (7) of the lamp (1) and forming a series circuit therewith, and means (3) supplying a d-c voltage to operate the lamp,
   and comprising, in accordance with the invention,
   two capacitors (4, 5) of equal capacity value, serially connected across the d-c voltage supply (3), the series circuit of the inductance (2) and the lamp (1) being connected to the junction (6) of the serially connected capacitors;
   a first electronically controlled switch (10) connected to the free terminal (8) of one capacitor (4);
   a second electronically controlled switch (11) connected to the free terminal (9) of the other capacitor (5),
   said switches being connected to the other lamp terminal (12) forming the free terminal of the series circuit;
   and a timing control circuit (15) connected to and controlling both said switches to be alternately conductive,
   the timing control circuit providing a frequency-stable output control signal to said switches at a frequency matched to a certain operating frequency of the lamp (1) and controlling the electronically controlled switches to essentially instantaneous conduction and cut-off, respectively, and providing an essentially square-wave voltage to said electronically controlled switches at said frequency matched to the lamp operating frequency, and thus supplying a-c square-wave voltage to the lamp circuit.

2. Circuit according to claim 1, wherein the means supplying a d-c voltage to operate the lamp comprises a network connection adapted to receive alternating current at power supply frequency (50, 60 Hz);
   and a rectifier circuit (3) connected to said network terminals and having two output terminals connected, respectively, to the free terminals of said serially connected capacitors (4, 5).

3. Circuit according to claim 2, wherein said rectifier comprises a bridge rectifier.

4. Circuit according to claim 1, wherein said first and second electronically controlled switches (10, 11) comprise high-voltage, high-power switching transistors (22, 23).

5. Circuit according to claim 4, further including a protective diode (28, 29) bridging the collector-emitter path of the switching transistor (22, 23).

6. Circuit according to claim 1, further including an electronic self-regulating current limiting circuit (13, 14) serially connected with each of said first and second electronically controlled switches (10, 11).

7. Circuit according to claim 6, wherein said current limiting circuit comprises a limiting resistor (30, 31);
 a first transistor (32, 33) having its collector-emitter paths connected across the limiting resistor;
 means (38, 39) sensing current flow through the emitter-collector path of said transistor (32, 33), and deriving a current flow control signal;
 and control means (36, 37, 34, 35) connected to and responsive to said current flow control signal and, respectively, controlling the conduction of said transistor (32, 33) to be conductive, or blocked, respectively, if the current flow signal is below or above a predetermined value.

8. Circuit according to claim 7, wherein the means providing the current flow signal comprises a series resistor (38, 39) serially connected to the emitter-collector path of said transistor (32, 33), and the current flow signal responsive means (36, 37, 34, 35) comprises a transistor having its base-emitter circuit connected across the current sensing resistor (38, 39) and its emitter-collector path connected to the base of the transistor connected in series with the current signal supplying resistor (38, 39).

9. Circuit according to claim 1, wherein the timing control circuit (15) includes a stable-frequency, square-wave generator (16), an amplifier (17) having a current amplification transistor (55);
 an output transformer (60) having two secondaries (61, 62) respectively connected to said electronically controlled switches;
 and a d-c isolating capacitor (64) coupling the current amplification transistor (55) to the primary winding (63) of the output transformer (60).

10. Circuit according to claim 9, wherein the secondaries (61, 62) of the output transformer are electrically galvanically isolated from each other;
 said electronically controlled switches comprise transistors, and the respective secondaries are connected to the base-emitter junctions of said transistors.

11. Circuit according to claim 9, further including a power supply network to supply power to the control circuit (15), said power supply network including a capacitor (49) adapted to be connected to a source of alternating current; a pair of rectifiers (47, 48) being, respectively, connected to the capacitor in a V-rectifier arrangement, a charge capacitor (45) connected to the rectifier arrangement and in parallel with the d-c output thereof, and a filter circuit (43, 44) filtering the output from the charge capacitor.

12. Circuit according to claim 11, further including a voltage limiting element (46) connected to the rectifier arrangement to limit the output voltage thereof.

13. Circuit according to claim 11, futher including a timing circuit (42) providing a stable output frequency, the supply connection for the timing circuit being connected to the filter network;
 and an amplifier (17) providing a square-wave output voltage and having its power supply connected to the charge capacitor (45) of the rectifier arrangement.

14. Circuit according to claim 1, further including a capacitor (20) connected in parallel with the lamp and in series with said inductance (2);
 and wherein the inductance value of the inductance, and the capacity of said capacitor form a series resonant circuit which is tuned to a low odd harmonic including at least one of: third, fifth, seventh harmonic of the lamp operating frequency.

15. Circuit according to claim 1, further including (FIG. 4) a lamp starting or ignition circuit (19) serially connected with one of the terminals of the lamp (1), said ignition circuit comprising
 a pulse transformer (68) having its secondary (67) connected in series with the lamp;
 a high-frequency short-circuiting capacitor (20) bridging the lamp and the pulse transformer secondary;
 a pulse supply capacitor (70) connected to the primary (69) of the pulse transformer (68);
 and controlled circuit means (71) providing for controlled discharge of said pulse charge capacitor through the primary of the pulse transformer.

16. Circuit according to claim 15, wherein the controlled circuit means comprises a semiconductor switch, and a charging circuit (75) is provided to charge the capacitor (70);
 and a discharge control circuit comprising a discharge pulse control capacitor (74) and a charge resistor (73) therefor connected to trigger the controlled semiconductor circuit means to conduction and discharge the pulse capacitor through the pulse transformer.

17. Circuit according to claim 15, wherein the rectifier comprising a bridge rectifier, and the ignition or starting circuit is connected to the output of said bridge rectifier to be energized thereby.

18. Circuit according to claim 1, further including a d-c blocking capacitor (21) serially connected with the lamp series circuit.

* * * * *